US008732039B1

United States Patent
Chen et al.

(10) Patent No.: US 8,732,039 B1
(45) Date of Patent: May 20, 2014

(54) ALLOCATING REGIONAL INVENTORY TO REDUCE OUT-OF-STOCK COSTS

(75) Inventors: Maomao Chen, Bellevue, WA (US); Xiao Yu Li, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 55 days.

(21) Appl. No.: 12/981,382

(22) Filed: Dec. 29, 2010

(51) Int. Cl.
G06Q 10/00 (2012.01)

(52) U.S. Cl.
USPC ........ 705/28; 705/26.81; 705/26.1; 705/26.9; 705/7.31

(58) Field of Classification Search
USPC .................... 705/28, 26.81, 26.1, 26.9, 7.31
See application file for complete search history.

(56) References Cited

U.S. PATENT DOCUMENTS

| | | | |
|---|---|---|---|
| 5,963,919 A | 10/1999 | Brinkley et al. | |
| 6,341,269 B1 | 1/2002 | Dulaney et al. | |
| 6,834,266 B2 | 12/2004 | Kumar et al. | |
| 6,976,001 B1 | 12/2005 | Levanoni et al. | |
| 7,236,949 B2 | 6/2007 | Natan et al. | |
| 7,313,532 B2 | 12/2007 | Mariamova et al. | |
| 7,437,308 B2 | 10/2008 | Kumar et al. | |
| 7,437,323 B1 | 10/2008 | Valkov et al. | |
| 7,676,404 B2 | 3/2010 | Richard et al. | |
| 8,055,520 B2 | 11/2011 | Baumann et al. | |
| 2001/0047293 A1 | 11/2001 | Waller et al. | |
| 2002/0019759 A1 | 2/2002 | Arunapuram et al. | |
| 2002/0072988 A1* | 6/2002 | Aram | 705/26 |
| 2002/0178077 A1 | 11/2002 | Katz et al. | |
| 2003/0009410 A1 | 1/2003 | Ramankutty et al. | |
| 2003/0018513 A1 | 1/2003 | Hoffman et al. | |
| 2003/0033179 A1 | 2/2003 | Katz et al. | |
| 2003/0074251 A1 | 4/2003 | Kumar et al. | |
| 2003/0078850 A1 | 4/2003 | Hartman et al. | |
| 2003/0101107 A1* | 5/2003 | Agarwal et al. | 705/28 |
| 2003/0149578 A1 | 8/2003 | Wong | |
| 2003/0195791 A1 | 10/2003 | Waller et al. | |
| 2003/0216969 A1 | 11/2003 | Bauer et al. | |
| 2004/0039664 A1* | 2/2004 | Natan et al. | 705/28 |
| 2004/0172321 A1 | 9/2004 | Vemula et al. | |
| 2004/0172341 A1* | 9/2004 | Aoyama et al. | 705/26 |
| 2005/0033706 A1 | 2/2005 | Krikler et al. | |

(Continued)

OTHER PUBLICATIONS

U.S. Appl. No. 13/524,897, filed Jun. 15, 2012, Fedor Zhdanov, et al.

(Continued)

*Primary Examiner* — Ramsey Refai
(74) *Attorney, Agent, or Firm* — Robert C. Kowert; Meyertons, Hood, Kivlin, Kowert & Goetzel, P.C.

(57) ABSTRACT

Methods and systems for allocating regional inventory to reduce out-of-stock costs are described. A method may include identifying a total number of units of an item to be stored in a plurality of regions and determining an order forecast for the item in each of the plurality of regions. The method may also include receiving a unit out-of-stock cost of the item in each of the plurality of regions and calculating an expected cost for each of the plurality of regions based, at least in part, on the total number of units of the item, each region's respective order forecast, and each region's respective unit out-of-stock cost. The method may further include allocating a portion of the total number of units of the item to each of the plurality of regions to reduce a sum of the expected costs.

20 Claims, 8 Drawing Sheets

(56) References Cited

U.S. PATENT DOCUMENTS

| | | | |
|---|---|---|---|
| 2006/0224398 A1* | 10/2006 | Lakshman et al. | 705/1 |
| 2006/0282346 A1 | 12/2006 | Kernodle et al. | |
| 2007/0143157 A1 | 6/2007 | Sussman et al. | |
| 2007/0270990 A1 | 11/2007 | Katircioglu | |
| 2008/0147486 A1 | 6/2008 | Wu | |
| 2009/0125385 A1 | 5/2009 | Landvater | |
| 2009/0187468 A1 | 7/2009 | Krech | |
| 2009/0240544 A1 | 9/2009 | Cheng et al. | |
| 2010/0138273 A1 | 6/2010 | Bateni et al. | |
| 2010/0205039 A1 | 8/2010 | Basak et al. | |
| 2010/0312611 A1 | 12/2010 | Henderson et al. | |
| 2012/0054076 A1 | 3/2012 | Wu et al. | |
| 2012/0173304 A1* | 7/2012 | Hosoda et al. | 705/7.31 |

OTHER PUBLICATIONS

U.S. Appl. No. 13/172,726, filed Jun. 29, 2011, Jason W. Murray, et al.

U.S. Appl. No. 13/211,158, Aug. 16, 2011, Aniket Ajit Prabhune, et al.

U.S. Appl. No. 13/172,733, Jun. 29, 2011, Eric M. Mack, et al.

Benjamin W. Wah and Tao Wang, "Simulated Annealing with Asymptotic Convergence for Nonlinear Constrained Global Optimization," 2004, 15 pages.

Benjamin W. Wah, et al., "Hybrid Constrained Simulated Annealing and Genetic Algorithms for Nonlinear Constrained Optimization," 2001, 8 pages.

Benjamin W. Wah, et al., "The Theory of Discrete Lagrange Multipliers for Nonlinear Discrete Optimization," Research supported by National Science Foundation Grant NSF MIP 96-32316. Principles and Practice of Constraint Programming, Springer-Verlag, Oct. 1999, pp. 28-42.

Benjamin W. Wah, et al., "Constrained Genetic Algorithms and their Applications in Nonlinear Constrained Optimization," Proc. 12th International Conference on Tools with Articial Intelligence, Nov. 2000, 8 pages.

Benjamin W. Wah, et al., "Simulated annealing with asymptotic convergence for nonlinear constrained optimization," / Accepted: Oct. 16, 2006, © Springer Science+Business Media B.V. 2006, 37 pages.

Zhe Wu, "The Theory and Applications of Discrete Constrained Optimization Using Lagrange Multipliers," 221 pages, 2000.

U.S. Appl. No. 13/172,720, filed Jun. 29 2011, Jason W. Murray.

U.S. Appl. No. 13/172,728, filed Jun. 29, 2011, Jason W. Murray, et al.

* cited by examiner

Table I

| National demand | mean | 180 | | | |
|---|---|---|---|---|---|
| | variance | 2160 | | | |
| | stdev | 46.48 | | | |
| | cv | 0.26 | | | |
| | | Linear Scaling | | Variance Partition | |
| | | CR=0.8 | CR=0.8 | CR=0.8 | CR=0.8 |
| Regional demand | | Region W | Region E | Region W | Region E |
| | alpha | 0.3 | 0.7 | 0.3 | 0.7 |
| | Distribution | Gamma | Gamma | Gamma | Gamma |
| | Mean | 54 | 126 | 54 | 126 |
| | Variance | 194.4 | 1058.4 | 648 | 1512 |
| | stdev | 13.94 | 32.53 | 25.46 | 38.88 |
| | CV | 0.26 | 0.26 | 0.47 | 0.31 |
| | Target Inventory | 65 | 152 | 73 | 157 |
| | Ratio | 0.30 | 0.70 | 0.317 | 0.683 |

FIG. 4

Table II

| | | | |
|---|---|---|---|
| National demand | mean | 180 | |
| | vaiance | 2160 | |
| | stdev | 46.48 | |
| | cv | 0.26 | |
| National_inventory | R | 218 | |
| FC Inventory | | West | East |
| | Inventory Allocation | 0.314 | 0.686 |
| | Local_Inventory | 68 | 150 |
| Regional Demand | | Region W | Region E |
| | Distribution | Gamma | Gamma |
| | K | 4.50 | 10.50 |
| | Theta | 12.00 | 12.00 |
| | Mean | 54 | 126 |
| | Variance | 648 | 1512 |
| | Std | 25.5 | 38.9 |
| | Prob. (Demand>= Local Inventory) | 0.25 | 0.25 |
| Unit Cost of Out of Local Stock | | $1.00 | $1.00 |
| Measurement – Cost of FC | | $0.25 | $0.25 |

FIG. 5

Table III

| National demand | mean | 180 | |
|---|---|---|---|
| | vaiance | 2160 | |
| | stdev | 46.48 | |
| | cv | 0.26 | |
| National_inventory | R | 218 | |
| FC Inventory | | West | East |
| | Inventory Allocation | 0.323 | 0.677 |
| | Local_Inventory | 70 | 148 |
| Regional Demand | | Region W | Region E |
| | Distribution | Gamma | Gamma |
| | K | 4.50 | 10.50 |
| | Theta | 12.00 | 12.00 |
| | Mean | 54 | 126 |
| | Variance | 648 | 1512 |
| | Std | 25.5 | 38.9 |
| | Prob. (Demand>= Local Inventory) | 0.23 | 0.27 |
| Unit Cost of OOS | | $2.30 | $2.00 |
| Measurement – Cost of FC | | $0.53 | $0.53 |

FIG. 6

Table IV

| Method | Optimal | | Optimal (no cost consideration) | | Linear scaling | |
|---|---|---|---|---|---|---|
| | W | E | W | E | W | E |
| unit cost | $2.30 | $2.00 | $2.30 | $2.00 | $2.30 | $2.00 |
| mean | 54 | 126 | 54 | 126 | 54 | 126 |
| variance | 648 | 1512 | 648 | 1512 | 648 | 1512 |
| Inventory Allocation | 0.323 | 0.677 | 0.314 | 0.686 | 0.3 | 0.7 |
| Total Cost | $34.84 | | $35.06 | | $35.72 | |

ALLOCATING REGIONAL INVENTORY TO REDUCE OUT-OF-STOCK COSTS

BACKGROUND

To provide a wide selection of products that are readily available for delivery, many merchants (whether engaging in electronic or conventional "brick and mortar" commerce) may store those products in warehouses, fulfillment centers, or other inventory facilities. Keeping items in inventory may provide numerous benefits, such as, for example, accommodating variations in customer demand and/or a manufacturer or distributor's ability to supply those items. Typically, holding some quantities of a particular product "in stock" may enable a merchant to make such product available to customers in a more consistent fashion.

However, to maintain products in stock, a merchant may incur certain costs. Some of these costs may include, for example, real estate costs (e.g., lease costs, debt service, etc.), personnel costs, and facilities costs (e.g., utilities, maintenance, etc.). There may also be capital or economic costs related to the money that a merchant paid its vendor to obtain a stored product, which is then committed to inventory until payment for that product is received from a customer. Other types of costs may further include loss or damage due to accidents, or the like.

Balancing the benefits of keeping inventory with its associated costs often presents complex planning problems. And the harmonization of these various costs and benefits may be obtained with in-stock optimization mechanisms.

BRIEF DESCRIPTION OF THE DRAWINGS

FIG. 4 shows a table of results (Table I) from a first illustrative regional inventory allocation example according to some embodiments.

FIG. 5 shows a table of results (Table II) from a second illustrative regional inventory allocation example according to some embodiments.

FIG. 6 shows a table of results (Table III) from a third illustrative regional inventory allocation example according to some embodiments.

FIG. 7 shows a table (Table IV) comparing results from a first, second, and third illustrative regional inventory allocation examples according to some embodiments.

Figure 1:
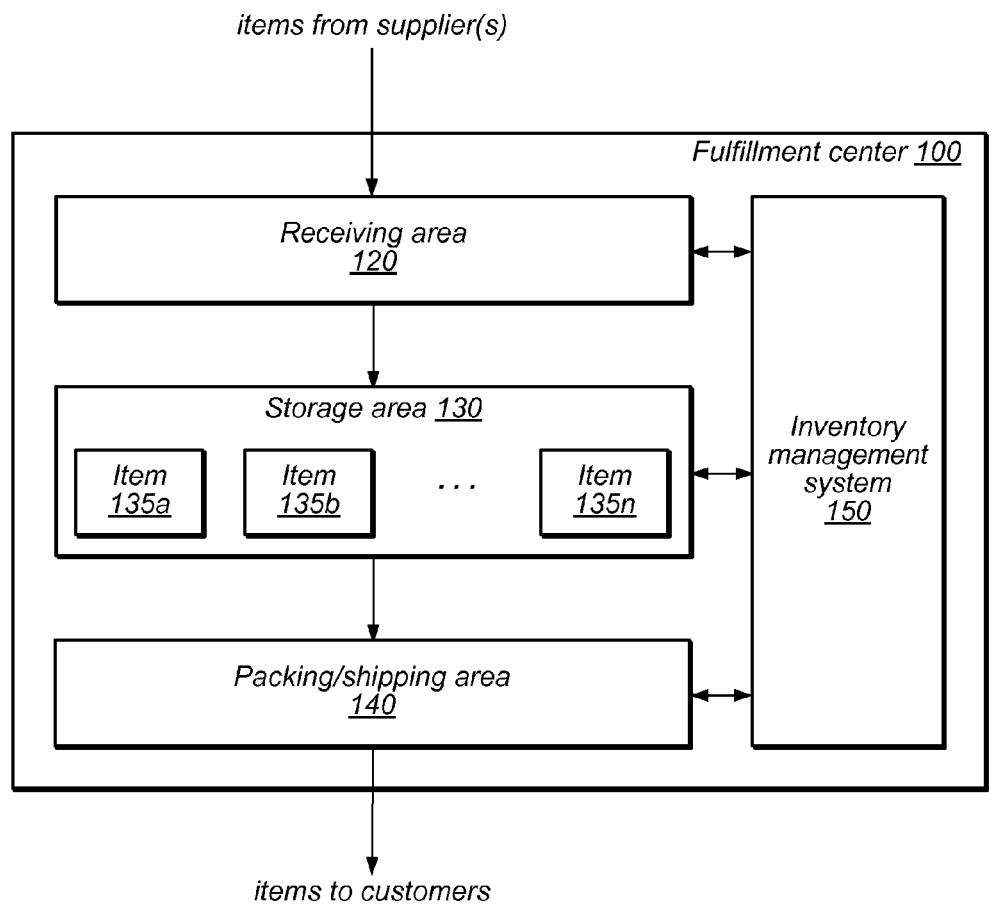
FIG. 1 is a block diagram of a fulfillment center according to some embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Various embodiments of systems and methods for allocating regional inventory to reduce out-of-stock costs are disclosed. In some embodiments, systems and methods described herein may allow a merchant to set inventory targets for items to be stored across a plurality of fulfillment centers (or clusters of fulfillment centers) in such a way that those targets enable the vendor to minimize or otherwise reduce expected out-of-stock costs. To this end, an optimization formulation is derived whose solution minimizes expected costs due to out-of-stock, whether or not in the presence of inventory constraints.

According to some embodiments, a method may include identifying a total number of units of an item to be stored in a plurality of regions, determining an order forecast for the item in each of the plurality of regions, and receiving a unit out-of-stock cost of the item in each of the plurality of regions. The method may also include calculating an expected cost for each of the plurality of regions based, at least in part, on the total number of units of the item, each region's respective order forecast, and each region's respective unit out-of-stock cost. The method may further include allocating a portion of the total number of units of the item to each of the plurality of regions to reduce a sum of the expected costs.

As used herein, the term "merchant" includes any entity capable of conducting and/or fulfilling a sales transaction in response to an actual or expected order or request. Typically, a merchant may present or offer various products or items to its customers, as well as information about those items (e.g., availability and pricing information, product details, images, etc.) that facilitate a sale. For example, a retail enterprise that generally sells merchandise to end consumers (e.g., not generally intended for resale as new) may sell through an online, web-based channel that may include an online catalog or portal configured to display information about items or products, a web-based order entry system such as a virtual shopping cart or other system, a status tracking tool through which customers may track the status or progress of orders, a search engine, and any of a number of other features suitable for promoting and performing sales transactions. Merchants may also engage in transactions using other types of sales channels. For example, a merchant may employ a mail-order catalog channel, where customers may receive information about items or products via a mailed catalog and make orders using paper forms and/or via telephone. Additionally or alternatively, a merchant may have a physical (i.e., "brick-and-mortar") store, through which customers may receive information about products and order or purchase those products in person.

As used herein, the term "customer" includes any purchaser (or potential purchaser) of an item or product, including entities other than an end consumer of a product sold. Therefore, manufacturers, distributors, retailers, and consumers may be "merchants" and/or "customers" depending upon their position within the supply chain. It is noted that in some embodiments, a unit of an item may be rented, leased or licensed to a customer under specific terms in exchange for revenue or other economic consideration.

As used herein, the term "sale" includes any suitable transaction involving an item resulting in either direct or indirect (e.g., imputed or tangential) revenue, and is intended to encompass rentals, leases, subscriptions, licenses, and other types of revenue models.

As used herein, the term "fulfillment center" includes any inventory storage facility such as, for example, warehouses, repositories, depositories, stockrooms, storehouses, distribution centers, material handling facilities, or the like.

In order to offer its customers a wider variety of items that are readily available for delivery, a merchant may store various quantities of such items within one or more fulfillment centers. An embodiment of one such fulfillment center is shown in FIG. 1. As illustrated, fulfillment center 100 includes receiving area 120, storage area 130 configured to store an arbitrary number of items or products 135a-n, and packing/shipping area 140. The arrangement of the various areas within the illustrated embodiment of fulfillment center 100 is depicted functionally rather than schematically. For example, in some embodiments, it is noted that multiple different receiving areas 120, storage areas 130, and packing/shipping areas 140 may be interspersed rather than segregated. Additionally, fulfillment center 100 includes an inventory management system 150 configured to interact with each of receiving area 120, storage area 130 and packing/shipping area 140.

Fulfillment center 100 may be configured to receive different kinds of items 135 from various suppliers and to store them until a customer order specifying particular ones of items 135 is received. The particular items 135 may then be selected from storage and sent to the customer. The general flow of items through fulfillment center 100 is indicated using arrows. Specifically, in the illustrated embodiment, items 135 may be received from one or more suppliers, such as manufacturers, distributors, wholesalers, etc. at receiving area 120. In various embodiments, items 135 may include merchandise, commodities, perishables, or any suitable type of item depending on the nature of the merchant or enterprise that operates fulfillment center 100. Upon being received from a supplier at receiving area 120, items 135 may be prepared for storage. For example, in some embodiments items 135 may be unpacked or otherwise rearranged, and inventory management system 150 (which, as described below, may include one or more software applications executing on a computer system) may be updated to reflect the type, quantity, condition, cost or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135 such as bulk products, commodities, etc. may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within storage area 130. In some embodiments, like items 135 may be stored together in bins, on shelves or via other suitable storage mechanisms, such that all items 135 of a given kind are stored in one location. For example, items having a common Universal Product Code (UPC), Stock-Keeping Unit (SKU) code, or other designation (including proprietary designations) may be stored together. In other embodiments, like items 135 may be stored in different locations. For example, to optimize retrieval of certain items 135 having high turnover within a large physical facility, those items 135 may be stored in several different locations to reduce congestion that might occur at a single point of storage.

When a customer order specifying one or more of items 135 is received, the corresponding items 135 may be selected or "picked" from storage area 130. In various embodiments, item picking may range from minimally automated to completely automated picking. For example, in one embodiment fulfillment center employees may pick items 135 using written or electronic pick lists derived from customer orders, while in another embodiment conveyor belts and robotics may be used to pick and transfer items 135. After the items 135 corresponding to a particular order are picked, they may be processed at packing/shipping area 140 for shipment to the customer. For example, items may be packaged for shipment to the customer using a common carrier, or simply bagged or otherwise prepared for direct transfer to a customer, e.g., at an order pickup counter. In some embodiments, further interaction with inventory management system 150 may occur when items 135 are picked from storage area 130 and/or processed at packing/shipping area 140, for example to update inventory records to reflect the removal of inventory, to record revenue for the sale or other transaction (e.g., lease, rental, exchange, etc.) and so forth.

Management of items 135 stored as inventory within fulfillment center 100 often presents complex optimization issues. Generally speaking, the level of inventory of a given item 135 may affect the quality of service associated with providing the given item to a customer. Quality of service may encompass factors such as general availability and selection of items 135, timeliness of order completion, or any other factors relevant to a customer's perceived experience in conducting business relating to items 135. As an example of the interaction between inventory levels and quality of service, if a particular item 135 ordered by a customer is not in stock within fulfillment center 100, the customer may be forced to wait for delivery until that particular item 135 can be obtained, or the customer may cancel the order resulting in a lost sale. Consequently, keeping a number of units of items 135 on hand may assist in the timely fulfillment of orders and increase customer satisfaction. A larger inventory, for example, may more readily accommodate unexpected increases in customer demand.

On the other hand, various costs are typically associated with storing items 135 in fulfillment center 100 for any period of time. In some embodiments, holding a unit of an item 135 in storage within storage area 130 may incur incremental storage costs. For example, the cost of providing fulfillment center 100 in which items 135 may be stored may include recurring real estate costs (e.g., lease costs, debt service, etc.), personnel costs, facilities costs (e.g., utilities, maintenance, etc.) and, any other costs associated with fulfillment center 100. In addition to storage costs, in some embodiments, holding a unit of an item 135 in storage may incur capital or economic costs related to the price paid to obtain the item. That is, once working capital or cash flow is committed to a unit of an item 135 (e.g., once that unit is paid for), that economic value is not available for other purposes; the committed value is "tied up" in the corresponding inventory. Other types of costs may also be associated with holding units of items 135 in storage. For example, in the ordinary course of operation of fulfillment center 100, items 135 may be subject to loss or damage due to accidents or mishaps. A rate of loss, or a corresponding rate of insurance against such loss, may be included within an overall cost of holding a unit of an item 135. Also, over time, items 135 may depreciate, expire, spoil or become obsolete, which may also be expressed as part of a cost of holding such items 135. At least in part to avoid or minimize some of these various costs, it is common practice for a merchant to fulfill existing orders for items 135 as soon as those orders are received and processed.

A merchant that deals with customers on a large scale may not adequately meet its business goals with only a single fulfillment center 100. For example, a merchant that deals in many different types of items 135 and/or that services customers in a large geographical region may find it impractical to keep its entire inventory in one facility. In some instances, a merchant that faces the challenge of scaling its inventory and fulfillment handling capabilities may choose to deploy a more complex fulfillment network. To address these challenges, the merchant may implement an order fulfillment and inventory planning system or the like.

Figure 2:
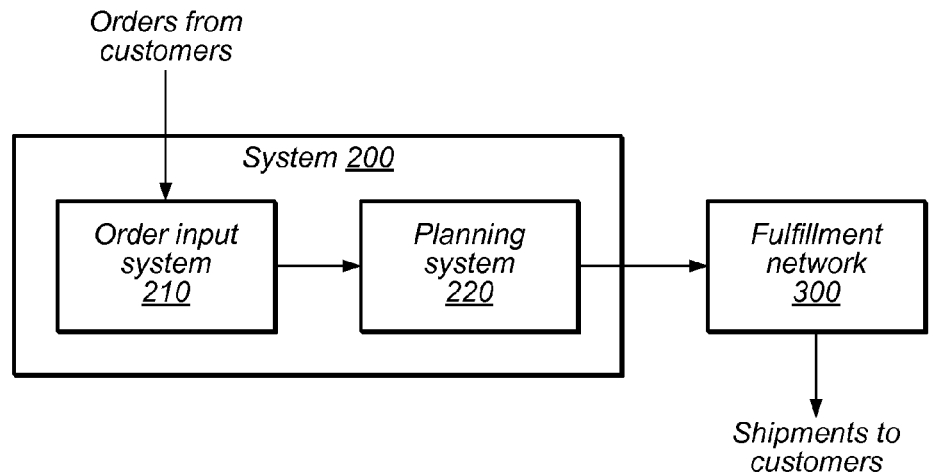
FIG. 2 is a block diagram of a system configured to receive customer orders and perform fulfillment planning according to some embodiments.

FIG. 2 illustrates an embodiment of a system configured to receive customer orders and perform order fulfillment and inventory allocation planning according to some embodiments. Specifically, system 200 may be configured to receive customer orders for items 135, determine how customer orders should be assigned to the resources of network 300 for fulfillment, and dispatch instructions to the assigned resources of network 300 in order to effect shipment of customer orders. In some embodiments, system 200 may also determine how to allocate inventory items in the fulfillment center (e.g., whether or not to allocate, how many units). In the illustrated embodiment, system 200 includes an order input system 210 that is configured to communicate with a fulfillment and inventory planning system 220, which is in turn configured to communicate with network 300.

Generally speaking, order input system 210 may be configured to receive orders placed by customers for various items 135 offered by the merchant. In some embodiments, order input system 210 may be configured to implement an electronic commerce (e-commerce) portal, such as a web-based interface through which customers may browse items 135, select items 135 for ordering, and supply details regarding orders (e.g., payment information, shipping address information, etc.). In other embodiments, order input system 210 may be configured to implement an order entry interface that is not presented to the customer directly, but which is instead employed by an agent (e.g., a salesperson, customer service representative, etc.) to input order information on behalf of a customer.

Planning system 220 may generally be configured to receive incoming orders received by the merchant via order input system 210 and to analyze customer orders to determine how they should be assigned to various fulfillment centers of network 300 for fulfillment. For example, if a given customer orders five distinct items 135, it may be possible to ship all of the ordered items 135 from a single fulfillment center 100. However, it may also be possible to divide the given customer's order for fulfillment by multiple different fulfillment centers 100. As discussed below, numerous different variables and constraints may be taken into account by planning system 220 when generating a fulfillment plan for an order, such as the costs associated with various plans, the promises made to the customer regarding shipping or arrival dates, or other factors.

After identifying the fulfillment plan that should be executed for a particular order, fulfillment and inventory planning system 220 may be configured to communicate instructions to network 300 in order to realize the plan. For example, fulfillment and inventory planning system 220 may interact with the inventory management system 150 of a fulfillment center 100 corresponding to a particular fulfillment center to instruct that certain items 135 of a particular order should be picked, packed, and shipped to the customer for the particular order. Alternatively, planning system 220 may interact with a drop shipper, such as a third party merchant or distributor, to instruct that certain items 135 of a particular order should be shipped to the customer. In various embodiments, communication of fulfillment instructions that are needed to implement a particular fulfillment plan to the various fulfillment centers 100 within network 300 may occur according to any suitable technique. For example, planning system 220 may be configured to exchange messages with systems within a particular fulfillment center using web-based protocols (e.g., Hypertext Transfer Protocol (HTTP), eXtensible Markup Language (XML), or other suitable protocols) conveyed via the public Internet, a private intranet, Virtual Private Networks, or another suitable networking scheme or combination of these. Communication between planning system 220 and fulfillment centers may also be implemented using electronic mail or other messaging techniques, analog or digital telephony, or any other wired or wireless data transfer technique, either using standard or proprietary protocols.

In various embodiments, order input system 210 and planning system 220 may be implemented as respective dedicated computer systems, or they may be implemented as computer-executable instructions and data that may be executed by one or more computer systems (e.g., as described in greater detail below with respect to FIG. 9). Systems 210 and 220 are discussed and shown as separate systems in order to facilitate their description; however, in some embodiments, the functions of these systems may be integrated into and implemented by a single computer system or set of computer-executable instructions. Alternatively, the functionality of systems 210 and 220 may be partitioned differently than is shown in FIG. 2. For example, some functions of these systems may be assigned to or subsumed within the operation of other systems.

Additionally, it is contemplated that order input system 210 and/or planning system 220 may interact with or implement various features of a number of other features not shown. For example, in one embodiment, order input system 210 may be configured to interact with accounting and billing systems in order to collect customer payments and update enterprise financial records to reflect the effects of transactions. In one embodiment, planning system 220 may be configured to interact with additional systems that track the current state of inventory within network 300 and/or predict its future state (e.g., by predicting lead time for various items 135, accounting for items 135 that are inbound to network 300 but not yet received by fulfillment centers, or analyzing or predicting other network state variables). Planning system 220 may also interact with other systems that model or estimate variables that may influence the planning process, such as the expected transit time for shipping from a particular fulfillment center to a customer via a particular carrier and/or shipping method.

Figure 3:
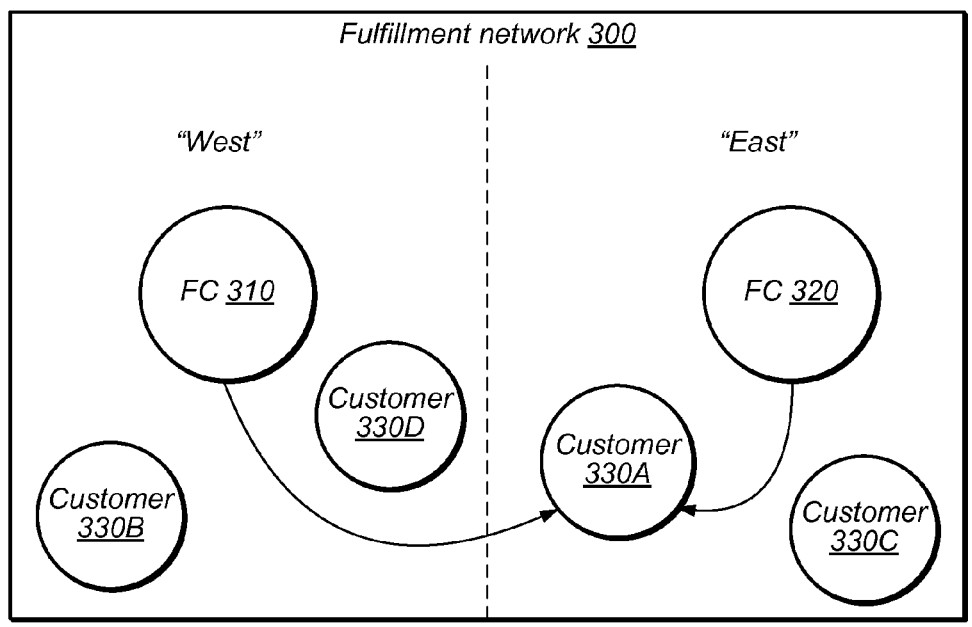
FIG. 3 is a block diagram of a fulfillment network operated by a merchant according to some embodiments.

As noted above, a merchant may operate or otherwise have at its disposal a fulfillment network that includes a number of individual fulfillment centers distributed across a wide geographic area (e.g., North America). Turning now to FIG. 3, a diagram of fulfillment network 300 is depicted according to some embodiments. As illustrated, fulfillment network 300 includes two regions: "East" and "West." Each region includes at least one fulfillment center, and each of fulfillment centers 310 and/or 320 may be similar to fulfillment center 100 described above with respect to FIG. 1. Moreover, a plurality of customers 330A-D may be distributed among the various regions in any manner. As illustrated, customers 330A and 330C are located within the East region, whereas customers 330B and 330D are located within the West region.

Although fulfillment network 300 is shown with two regions, other embodiments are not limited to this particular configuration and may include any suitable number of regions. Similarly, although each region is shown as having a fulfillment center, in other embodiments each region may include any number of fulfillment center "clusters," each cluster having any number of fulfillment centers or "nodes." In some embodiments, fulfillment network 300 may span an entire state, country, continent, or the world. Further, each region (e.g., "East," "West," etc.) may represent a geographical area encompassing delivery addresses to which shipping or delivery costs are similar (e.g., costs within $0.05, $0.10, $0.25, $1.00 or some other specified amount of each other). As such, in some cases, "regions" need not be adjacent and/or contiguous with respect to each other (e.g., there may be one or more "islands" within the "East" region that addresses with same shipping costs as the "West" region and vice versa). Furthermore, although fulfillment centers 310 and/or 320 are shown as being "within" the West and East regions, respectively, in some cases a particular fulfillment center may be outside of a given geographic region but may nonetheless be assigned to that region. In general, the granularity with which regions covered by a given fulfillment network are defined may depend on data available for making similar-shipping-cost determinations and/or on the level of precision desired by the merchant.

Still referring to FIG. 3, customer 330 may place one or more orders with the merchant for one or more units of one or more items. For simplicity of explanation, however, let us consider a situation where customer 330 places one order for one unit of one item. The order may be placed online (i.e., with a computer device connected to the Internet), via a mail-in form, via a telephone, in-person, or in any other suitable manner. In the case of an online order, that order may be received, for example, by order input system 210 shown in FIG. 2. The customer may select the item for purchase and add it item to a virtual "shopping cart." During a "checkout" procedure, the customer may provide billing and/or shipping address information to the merchant, as well as specify shipping/delivery options for the item, such as, for example, same-day delivery, next-day delivery, two-day delivery, 3-5 business days, 5-8 business days, etc.

Once the order is completed, the merchant may have an opportunity to make decisions as to how to fulfill the order (e.g., which of fulfillment centers 210 or 220 will the item ship from, etc.). As between fulfillment centers 310 and 320, for example, it is apparent that customer 330 is located closest to fulfillment center 320—i.e., in the East region. (In fact, however, customer 330 may be located anywhere, but his or her order specifies a delivery address in the East region.) Therefore, in most cases, is likely that the order will be fulfilled from fulfillment center 320—that is, assuming that fulfillment center 320 has the item in stock. Should fulfillment center 320 have run out-of-stock of the ordered item, however, the order may have to be fulfilled by fulfillment center 310. Moreover, because fulfillment center 310 is more distant from customer 330 than fulfillment center 320, it is likely that the cost of shipping the item to customer 330 from fulfillment center 310 will be higher than from fulfillment center 320. This "extra" shipping cost is typically absorbed by the merchant, and therefore it represents an example of fulfillment center 320's out-of-stock costs with respect to that particular item.

In some embodiments, out-of-stock costs may be different for different items. For instance, assume that the merchant's cost of shipping item. A from fulfillment center 320 to customer 330 is $2.50, and that the merchant's cost of shipping that same item from fulfillment center 310 to customer 330 is $3.00. In this first case, the out-of-stock cost of item A in fulfillment center 320 is $0.50 (that is, $3.00-$2.50). Further, assume that the merchant's cost of shipping item B from fulfillment center 320 to customer 330 is $3.00, and that the merchant's cost of shipping that same item from center 310 to customer 330 is $4.00. In this second case, the out-of-stock cost of item B in fulfillment center 320 is $1.00 (that is, $4.00-$3.00). Therefore, even though in both cases fulfillment center 320's out-of-stock is remedied by fulfillment center 310, out-of-stock costs are different for items A and B.

In other embodiments, out-of-stock shipping costs may be "asymmetrical" with respect to two fulfillment centers or regions. For example, assume that customer 330 is instead located in the west region, that fulfillment center 310 had run out-of-stock of item A, and that the shipping cost to the merchant of shipping that item from fulfillment center 320 to customer 330 is $3.25. Hence, the out-of-stock shipping cost of item A in fulfillment center 310 is $0.75 (that is, $3.25-$2.50) when the order is fulfilled by fulfillment center 320, which is different from the out-of-stock shipping cost of item A in fulfillment center 320 ($0.50) when the order is fulfilled by fulfillment center 310. In some cases, such cost asymmetry may result, for example, from varying shipping rates offered by carriers, different flight or delivery truck routes among the various areas of fulfillment network 300, etc.

In embodiments where two or more fulfillment centers are clustered within a region, out-of-stock costs may be averaged across a number of fulfillment centers within that region to yield an average out-of-stock cost for the entire region. To calculate this average, the out-of-stock cost of each fulfillment center may be weighed in any suitable way—e.g., out-of-stock cost of fulfillment center A may be assigned more weigh than the out-of-stock cost of fulfillment center B if, for instance, the volume of sales fulfilled by fulfillment center A is larger than the volume of sales fulfilled by fulfillment center B in their region.

Additionally or alternatively, out-of-stock costs may be averaged in other ways. For example, if fulfillment center A's out-of-stock may be cured by fulfillment center B or fulfillment center C, and additional shipping costs of fulfillment center B are different than fulfillment center C's, then the merchant may average those costs. And, similarly as described previously, this averaging may implement any suitable weighing—e.g., the additional cost of shipping from fulfillment center B may be assigned more weight if, for instance, fulfillment center A's out-of-stock is fulfilled by fulfillment center B more often than by fulfillment center C.

In the examples described above, out-of-stock costs include the additional cost to the merchant of shipping an item from a more distant fulfillment center (or cluster of fulfillment centers) to fulfill the customer's order. Generally speaking, however, "out-of-stock costs" may include any costs that may, be reasonably modeled as a cost to the merchant due to a particular fulfillment center having run out-of-stock of a particular item. For instance, if a customer attempts to purchase an item for same-day-delivery and the local fulfillment center has run out-of-stock of that item, it may not be possible for the merchant to fulfill the order from more distant fulfillment centers or regions. In that case, the customer may not be able to purchase the item at all, and the "out-of-stock costs" may represent a lost sale. Additionally or alternatively, "out-of-stock costs" may represent a loss of goodwill or any tangible or intangible cost.

To minimize or otherwise reduce expected costs due to out-of-stock, an inventory optimization problem formulation may be provided as follows. First, the merchant may obtain local demand information from a demand forecast distribution for a plurality of regions to generate desired or target local inventory quantities. For example, given the demand probability distribution for fulfillment network 300 (e.g., "national distribution"), the merchant may partition that distribution between regions (east and west) and into local demand distributions.

In some instances, national forecast data for any particular item may take the form of a gamma distribution:

$$\text{Gamma}(k,\theta) \tag{1}$$

where k is a shape parameter and $\theta$ is a scale parameter of the distribution.

To find the local demand distribution, the merchant may find the quantile of the national forecast Q and then multiply Q by the fraction of demand $\alpha_i$ in a particular region i, where $\Sigma_i \alpha_i = 1$. Therefore, the desired regional inventory level may be given by $\alpha_i Q$. This may be referred to as a "linear scaling" method, as it partitions the national forecast into regional demand by linearly partitioning scale parameter $\theta$. The linear scaling method may be appropriate in some cases, such as, for example, where it may be assumed that regional demand is perfectly correlated to national demand. In those cases, the local demand distribution $F_i(\ )$ for region i may be given by:

$$F_i(\ ) \sim \text{Gamma}(k, \alpha_i \theta) \tag{2}$$

Alternatively, the merchant may linearly partition shape parameter k of the national forecast. In other words, instead of assuming that regional demand is perfectly correlated to national demand, it may be assumed that regional forecast is independent from the national forecast, and given by:

$$F_i(\ ) \sim \text{Gamma}(\alpha_i k, \theta) \tag{3}$$

First Illustrative Example

In this example, assume that there are no inventory constraints (e.g., physical space to store items in a given fulfillment center, monetary budget, etc.). To achieve local instock at a certain critical ratio (CR), the merchant may find out the quantile of the local demand distribution (partitioned as described above) at the given CR.

To illustrate this, suppose a "national area" includes two regions (e.g., "east" and "west") as shown in FIG. 2, and the merchant would like to achieve instock 0.8 in both regions. The merchant receives national demand data that indicates the national forecast distribution to be proportional to Gamma (15, 12)—i.e., k=15 and $\theta$=20. Specifically, the national demand is given has a mean equal to 180, variance equal to 2160, standard deviation (stdev) equal to 46.48, and a coefficient of variation (cv) equal to 0.26. Also, regional demand data indicates that $\alpha_w$=0.3 and $\alpha_E$=0.7 for each respective regions. This information is summarized in Table I shown in FIG. 4.

In this example it may be seen that, using linear scaling to partition the national demand into regional demand, the target inventory for the item in the west region ("Region W") at instock 0.8 is 65 units and the target inventory for the item in the east region ("Region E") at instock 0.8 is 152 units. Using variance partition, the target inventory for the item in Region W at instock 0.8 is 73 and the target inventory for the item in Region E at instock 0.8 is 126. Because there are no capacity constraints and the goal is simply to achieve instock of 0.8, further optimization is not necessary.

In contrast with the example described above, in other embodiments the total inventory across the various regions (e.g., national or global inventory) may be constrained, whether by physical space of monetary budget. Accordingly, systems and method described herein provide an inventory optimization problem formulation is whose solution minimizes or otherwise reduces the expected cost due to out-of-stock in the presence of those constraints. For example, for any given item whose national inventory level is R, an inventory allocation factor $x_i$ in fulfillment center i may be found in such a way that the incurred additional cost due to local out-of-stock is reduced or minimized for a fixed planning horizon.

First, assume that a fulfillment center i's regional demand $u_i$ is generally fulfilled from local stock. If local stock is insufficient to meet regional demand $u_i$, then for each unit of the item subsequently ordered the merchant incurs a unit out-of-stock cost $C_i$ (e.g., the cost of fulfilling the order for one unit of the item from another fulfillment center). Also assume that regional demand $u_i$ has a density distribution $f_i(\ )$, national inventory level is R, and inventory allocation factor is $x_i$. Then, the probability that fulfillment center i will run out-of-stock of this item is:

$$\int_{Rx_i}^{\infty} f_i(u_i) du_i \tag{4}$$

The number of expected units that cannot be fulfilled by local stock is given by:

$$\int_{Rx_i}^{\infty} (u_i - Rx_i) f_i(u_i) du_i \tag{5}$$

And the expected incurred cost is:

$$C_i \int_{Rx_i}^{\infty} (u_i - Rx_i) f_i(u_i) du_i \tag{6}$$

In some embodiments, the goal of minimizing the sum of expected costs due to out-of-stock may be expressed as:

$$\text{minimize } \Sigma_i C_i \int_{Rx_i}^{\infty} (u_i - Rx_i) f_i(u_i) du_i \tag{7}$$

Such that:

$$\sum_{i=1}^{N} x_i = 1 \tag{8}$$

The extrema of equation (7) may be searched by introducing a Lagrange multiplier $\lambda$ and looking for a maximum of Lagrangian:

$$U(x_1, \ldots, x_N) = \sum_i C_i \int_{Rx_i}^{\infty} (u_i - Rx_i) f_i(u_i) du_i - \lambda \left( \sum_{i=1}^{N} x_i - 1 \right) \tag{9}$$

The first order conditions at extremum $(x_1^*, \ldots, x_N^*)$ are:

$$\frac{\partial U}{\partial x_k}(x_1^*, \ldots, x_N^*) = 0 \tag{10}$$

That is, the equation to be solved is:

$$\frac{\partial U}{\partial x_k}(x_1^*, \ldots, x_N^*) = \lambda \tag{11}$$

Differentiating equation (11) yields:

$$\frac{\partial}{\partial x_k}\left(\int_{Rx_k}^{\infty} C_k(u_k - Rx_k)f_i(u_k)du_k\right) = \lambda \quad (12)$$

Hence:

$$\int_{Rx^*_k}^{\infty} C_k R f_i(u_k)du_k = \lambda| \quad (13)$$

Thus, the optimal $x^*_k$ values may be those that make the expected loss or cost equal for all fulfillment centers; that is:

$$C_1\int_{Rx^*_1}^{\infty} f_1(u_1)du_1 = C_2\int_{Rx^*_2}^{\infty} f_2(u_2)du_2 = \ldots = C_N\int_{Rx^*_N}^{\infty} f_N(u_N)du_N| \quad (14)$$

Let $F(\,)$ be the cumulative distribution function, then equation (14) may be written as:

$$C_1(1-F_i(Rx^*_1)) = C_2(1-F_2(Rx^*_2))\ldots = C_N(1-F_N(Rx^*_N)) \quad (15)$$

Accordingly, equation (15) may be solved (each term corresponding to regions i=1, 2, . . . N) in order to obtain an inventory allocation factor $x_i$ in each region. The examples that follow apply this model in different scenarios.

Second Illustrative Example

In this example, assume that the total national inventory quantity—that is, the inventory constraint across all regions—is 218 units. The merchant receives national demand data identical to that of the first illustrative example discussed above. Particularly, the national forecast distribution is proportional to Gamma (15, 12)—i.e., k=15 and θ=20—the mean is equal to 180, the variance is equal to 2160, the standard deviation (stdev) is equal to 46.48, and the coefficient of variation (cv) is equal to 0.26. The national forecast is partitioned between its two regions using variance partition.

Also, it is assumed that the out-of-stock costs are the same for both regions—i.e., the additional cost of having an order for the item be fulfilled by a fulfillment center in Region W due to out-of-stock in Region E and the cost of having the order fulfilled by a fulfillment center in region E due to out-of-stock in Region W are each $1.00. The results from the application of equation (15) are shown in Table II depicted in FIG. 5.

From Table II, it may be noted that optimal inventory allocation factors for Regions W and E are 0.314 and 0.686, respectively. When these inventory allocation factors are applied to the inventory constraint (218 units), the target inventory in Region W is 68 units and the target inventory in Region E is 150 units. Moreover, these target inventories are found to minimize the expected loss or out-of-stock costs given the regional demand forecast.

Third Illustrative Example

This example is similar to the second illustrative experiment described above, and it is based upon the same underlying national and regional forecasts, as well as the same inventory constraint (218 units). In this case, however, out-of-stock costs are asymmetric—i.e., the cost to fulfill an order in Region W from Region E is $2.30, whereas the cost to fulfill order in Region E from Region W is $2.00. The results from the application of equation (15) are shown in Table III depicted in FIG. 6.

It may be noted from Table III that the optimal inventory allocations between Regions W and E are now 0.323 and 0.677, respectively. When applied to the inventory constraint (218 units), this results in a target inventory in Region W of 70 units and a target inventory in Region E of 148 units. In contrast with the second illustrative example, here the model reveals that Region W, at least in part because of its higher out-of-stock costs, should be allocated a larger portion of the inventory (i.e., 70 as opposed to 68). Furthermore, these target inventories are found to minimize the expected loss due to out-of-stock in light of the regional forecast and asymmetric cost structure.

Referring to FIG. 7, Table IV is provided to provide a comparison of results among the three illustrative examples discussed above. For sake of consistency, the asymmetric cost structure of the third illustrative example is carried over to the first and second illustrative examples. The right-hand column shows the results of the first example, the middle column shows the results of the second example (but with, no cost consideration in calculating inventory allocations), and the left-hand column shows the results of the third example. Here it may be seen that the model used in second example reduces expected loss or out-of-stock costs compared with the model used in the first example ($35.06 vs. $35.72), and that the model used in the third example reduces those costs even further ($34.84 vs. $35.06). Therefore, accounting asymmetric out-of-stock costs may, in some cases, provide more accuracy.

Still referring to FIG. 7, it should be noted that the dollar amounts used in Table IV resulted from arbitrarily selected numbers. In most cases, out-of-stock costs for any given item may reach several thousands or millions of dollars over one or more planning periods depending on the size of the merchant's operations, etc. Furthermore, the inventory allocation models described herein may be used for several items (or every item) sold by a merchant, and are thus scalable to potentially result in significant cost savings.

Figure 8:
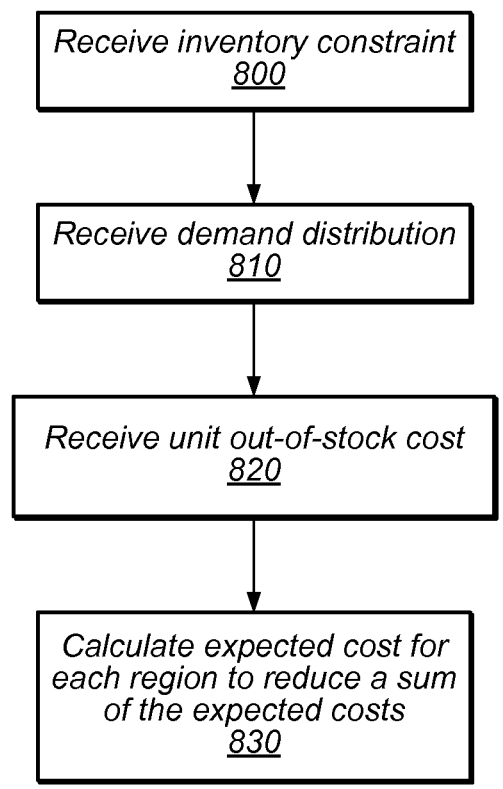
FIG. 8 is a flow diagram of a method for allocating regional inventory to reduce out-of-stock costs according to some embodiments.

Turning now to FIG. 8, a method for allocating regional inventory to reduce out-of-stock costs is depicted according to some embodiments. In some cases, the method of FIG. 8 may be performed by system 200 of FIG. 2 (e.g., planning system 220) for any number of items to be stored in any number of fulfillment centers. Further, the method of FIG. 8 may be repeated periodically and/or in connection with any specified inventory planning period (e.g., once a day, twice a week, 4 times a quarter, etc.).

At block 800, the method receives an inventory constraint or otherwise identifies a total number of units of an item to be stored in a plurality of regions. At block 810, the method determines an order forecast or demand distribution for the item in each of the plurality of regions. In some cases, the demand distribution may be for a product (i.e., an electronic device, etc.) or for group of products (e.g., a product line, type, category, etc.). Further, obtaining the order forecast may include linearly partitioning, among the plurality of regions, a scale or shape parameter of an order forecast distribution for a geographic region encompassing the plurality of regions.

At block 820 the method receives or otherwise determines an unit out-of-stock cost of the item in each of the plurality of regions. The unit out-of-stock cost in a given one of the plurality of regions may include, for example, a cost of fulfilling an order for one unit of the item from another one of the plurality of regions due at least in part to the given one of the plurality of regions being unable to fulfill the order. At 830, the method calculates an expected cost for each of the plurality of regions based, at least in part, on the total number of units of the item, each region's respective order forecast, and each region's respective unit out-of-stock cost.

The calculation may be performed, for example using equation (15) to allocate a portion of the total number of units of the item to each of the plurality of regions to reduce a sum of the expected costs. For example, at block 830 the method may derive inventory allocation factors that make the expected cost for each of the plurality of regions fall within a specified range (e.g., costs within 10% of each other, etc.). In some cases, inventory allocation factors may make the expected cost for each of the plurality of regions approximately equal to each other. Moreover, in some cases, the resulting inventory allocation may minimize the sum of the expected costs.

In various embodiments, an optimization, minimization, and/or maximization process may not always guarantee convergence to an absolute solution. For example, an optimization process may exhaustively evaluate a solution space to ensure that the identified solution is the best available. Alternatively, the optimization process may employ heuristic or probabilistic techniques that provide a bounded confidence interval or other measure of the quality of the solution. For example, an optimization process may be designed to produce a solution that is within at least some percentage of an optimal solution, to produce a solution that has some bounded probability of being the optimal solution, or any suitable combination of these or other techniques.

In some embodiments, one or more of the methods or techniques described above may be implemented as program instructions and data capable of being stored or conveyed via an article of manufacture including a computer-readable or -accessible medium. Such methods or techniques may include, for example and without limitation, the functions of an inventory planning or allocation system configured to implement the methods described herein and any suitable variations thereof. Such program instructions may be executed to perform a particular computational function, such as inventory allocation, inventory, health metric generation and analysis, purchase offer analysis, purchase and/or sales management, operating system functionality, applications, and/or any other suitable functions.

Figure 9:
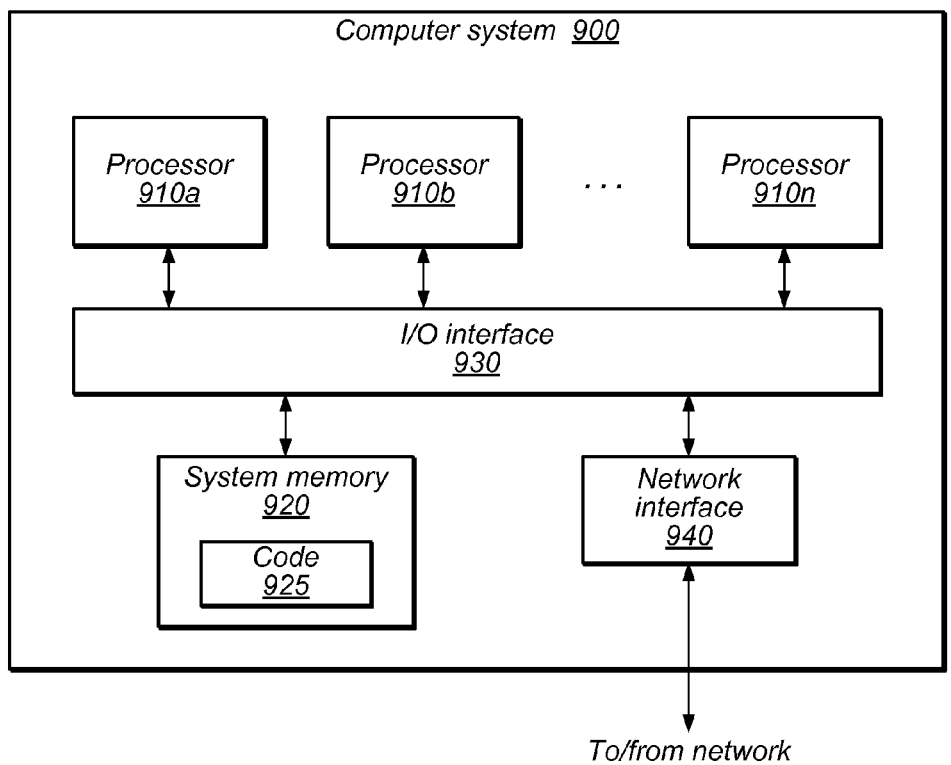
FIG. 9 is a block diagram illustrating a computer system configured to implement an inventory planning or allocation system according to some embodiments.

An embodiment of a computer system including computer-accessible media is illustrated in FIG. 9. As illustrated, computer system 900 includes one or more processors 910 coupled to a system memory 920 via an input/output (I/O) interface 930. Computer system 900 further includes a network interface 940 coupled to I/O interface 930. In some embodiments, planning system 220 may be implemented using a single instance of computer system 900, while in other embodiments multiple such systems may be configured to host different portions or instances of a planning system. Moreover, in some embodiments, some data sources or services (e.g., purchasing management services) may be implemented via instances of computer system 900 that are distinct from those instances implementing other data sources or services (e.g., order entry).

In various embodiments computer system 900 may be a single processor system including one processor 910, or a multiprocessor system including several processors 910 (e.g., two, four, eight, or another suitable number). Processors 910 may be any suitable processor capable of executing instructions. For example, in various embodiments processors 910 may be a general-purpose or embedded processor implementing any of a variety of instruction set architectures (ISAs), such as the x96, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by process 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 920 as code 925.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network, such as other computer systems, for example. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include storage media or memory media such as magnetic or optical media—e.g., disk or CD/DVD-ROM coupled to computer system 900 via I/O interface 930. A computer-accessible medium may also include any volatile or non-volatile media such as RAM (e.g., SDRAM, DDR SDRAM, RDRAM, SRAM, etc.), ROM, etc, that may be included in some embodiments of computer system 900 as system memory 920 or another type of memory. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 940.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method, comprising:
performing, by one or more computing devices, each including at least a processor and a memory,
identifying, by at least one of the one or more computing devices, a total number of units of an item to be stored in a plurality of regions;
determining, by at least one of the one or more computing devices, an order forecast for the item in each of the plurality of regions, wherein determining the order forecast for the item includes linearly partitioning a probabilistic model of an order forecast distribution among the plurality of regions dependent upon respective parameters corresponding to the plurality of regions, wherein for each of the regions, the respective parameter includes one or more of a shape parameter or a scale parameter of the probabilistic model of the order forecast distribution;
receiving, by at least one of the one or more computing devices, a unit out-of-stock cost of the item in each of the plurality of regions, wherein for a given one of the plurality of regions, the unit out-of-stock cost of the item in the given region indicates a cost of fulfilling a unit of the item in the event that the item is out-of-stock in the given region;
calculating, by at least one of the one or more computing devices, an expected cost for each of the plurality of regions based, at least in part, on the total number of units of the item, each region's respective order forecast, and each region's respective unit out-of-stock cost; and
allocating, by at least one of the one or more computing devices, respective portions of the total number of units of the item to each of the plurality of regions to reduce a sum of the expected costs, such that the allocating reduces expected costs specifically due to the item being out-of-stock in the plurality of regions, wherein allocating a particular portion of the total number of units of the item to the given region comprises instructing that the particular portion of the total number of units of the item be physically stored within the given region prior to the particular portion of the total number of units being used to fulfill a customer order.

2. The method of claim 1, wherein the order forecast includes a forecast corresponding to an individual item.

3. The method of claim 1, wherein the order forecast includes a forecast corresponding to a category of items.

4. The method of claim 1, wherein identifying the total number of units of the item comprises determining a number of units of the item available to a geographic region that includes the plurality of regions.

5. The method of claim 1, wherein the probabilistic model of the order forecast distribution models the order forecast distribution as a gamma distribution.

6. The method of claim 1, wherein for a set of N regions, N being an integer greater than 1, allocating a portion of the total number of units of the item to each of the plurality of regions comprises computationally solving a set of equations given by:

$$C_1(1-F_1(Rx^*_1)) = C_2(1-F_2(Rx^*_2)) \ldots = C_N(1-F_N(Rx^*_N));$$

wherein R denotes the total number of units of the item to be stored, each of $C_1 \ldots C_N$ denotes the unit out-of-stock cost in a corresponding region, each of $F_1 \ldots F_N$ denotes a cumulative distribution function for a corresponding region, and each of $x_1^* \ldots x_N^*$ denotes a target number of units to be stored in a corresponding region.

7. The method of claim 1, wherein the unit out-of-stock cost in a given one of the plurality of regions comprises a cost of fulfilling an order for the item from another one of the plurality of regions due at least in part to the given one of the plurality of regions being unable to fulfill the order.

8. The method of claim 1, wherein allocating the portions of the total number of units to reduce the sum of the expected costs comprises minimizing the sum of the expected costs.

9. The method of claim 1, wherein allocating the portions of the total number of units to reduce the sum of the expected costs comprises deriving an inventory allocation factor for each of the plurality of regions that makes the expected cost for each of the plurality of regions fall within a specified range.

10. The method of claim 1, wherein allocating the portions of the total number of units to reduce the sum of the expected costs comprises deriving an inventory allocation factor for each of the plurality of regions that makes the expected cost for each of the plurality of regions approximately equal to each other.

11. An article of manufacture comprising a non-transitory computer-readable storage medium having instructions stored thereon that, upon execution by a computer system, cause the computer system to perform operations comprising:
identifying a total number of units of an item to be stored in a plurality of regions;
determining an order forecast for the item in each of the plurality of regions, wherein determining the order forecast for the item includes linearly partitioning a probabilistic model of an order forecast distribution among the plurality of regions dependent upon respective parameters corresponding to the plurality of regions, wherein for each of the regions, the respective parameter includes one or more of a shape parameter or a scale parameter of the probabilistic model of the order forecast distribution;
receiving a unit out-of-stock cost of the item in each of the plurality of regions, wherein for a given one of the plurality of regions, the unit out-of-stock cost of the item in the given region indicates a cost of fulfilling a unit of the item in the event that the item is out-of-stock in the given region;
calculating an expected cost for each of the plurality of regions based, at least in part, on the total number of units of the item, each region's respective order forecast, and each region's respective unit out-of-stock cost; and
allocating respective portions of the total number of units of the item to each of the plurality of regions to reduce a sum of the expected costs, such that the allocating reduces expected costs specifically due to the item being out-of-stock in the plurality of regions, wherein allocating a particular portion of the total number of units of the item to the given region comprises instructing that the particular portion of the total number of units of the item be physically stored within the given region prior to the particular portion of the total number of units being used to fulfill a customer order.

12. The article of manufacture of claim 11, wherein the probabilistic model of the order forecast distribution models the order forecast distribution as a gamma distribution.

13. The article of manufacture of claim 11, wherein for a set of N regions, N being an integer greater than 1, allocating a portion of the total number of units of the item to each of the plurality of regions comprises computationally solving a set of equations given by:

$$C_1(1-F_1(Rx^*_1))=C_2(1-F_2(Rx^*_2))\ldots =C_N(1-F_N(Rx^*_N));$$

wherein R denotes the total number of units of the item to be stored, each of $C_1 \ldots C_N$ denotes the unit out-of-stock cost in a corresponding region, each of $F_1 \ldots F_N$ denotes a cumulative distribution function for a corresponding region, and each of $x_1^* \ldots x_N^*$ denotes a target number of units to be stored in a corresponding region.

14. The article of manufacture of claim 11, wherein allocating the portions of the total number of units to reduce the sum of the expected costs comprises deriving an inventory allocation factor for each of the plurality of regions that makes the expected cost for each of the plurality of regions fall within a specified range.

15. The article of manufacture of claim 11, wherein allocating the portions of the total number of units to reduce the sum of the expected costs comprises deriving an inventory allocation factor for each of the plurality of regions that makes the expected cost for each of the plurality of regions approximately equal to each other.

16. A system, comprising:
 at least one processor; and
 a memory coupled to the at least one processor, wherein the memory stores program instructions, and wherein the program instructions are executable by the at least one processor to perform operations including:
  identifying a total number of units of an item to be stored in a plurality of regions;
  determining an order forecast for the item in each of the plurality of regions, wherein determining the order forecast for the item includes linearly partitioning a probabilistic model of an order forecast distribution among the plurality of regions dependent upon respective parameters corresponding to the plurality of regions, wherein for each of the regions, the respective parameter includes one or more of a shape parameter or a scale parameter of the probabilistic model of the order forecast distribution;
  receiving a unit out-of-stock cost of the item in each of the plurality of regions, wherein for a given one of the plurality of regions, the unit out-of-stock cost of the item in the given region indicates a cost of fulfilling a unit of the item in the event that the item is out-of-stock in the given region;
  calculating an expected cost for each of the plurality of regions based, at least in part, on the total number of units of the item, each region's respective order forecast, and each region's respective unit out-of-stock cost; and
  allocating respective portions of the total number of units of the item to each of the plurality of regions to reduce a sum of the expected costs, such that the allocating reduces expected costs specifically due to the item being out-of-stock in the plurality of regions, wherein allocating a particular portion of the total number of units of the item to the given region comprises instructing that the particular portion of the total number of units of the item be physically stored within the given region prior to the particular portion of the total number of units being used to fulfill a customer order.

17. The system of claim 16, wherein the probabilistic model of the order forecast distribution models the order forecast distribution as a gamma distribution.

18. The system of claim 16, wherein for a set of N regions, N being an integer greater than 1, allocating a portion of the total number of units of the item to each of the plurality of regions comprises computationally solving a set of equations given by:

$$C_1(1-F_1(Rx^*_1))=C_2(1-F_2(Rx^*_2))\ldots =C_N(1-F_N(Rx^*_N))$$

wherein R denotes the total number of units of the item to be stored, each of $C_1 \ldots C_N$ denotes the unit out-of-stock cost in a corresponding region, each of $F_1 \ldots F_N$ denotes a cumulative distribution function for a corresponding region, and each of $x_1^* \ldots x_N^*$ denotes a target number of units to be stored in a corresponding region.

19. The system of claim 16, wherein allocating the portions of the total number of units to reduce the sum of the expected costs comprises deriving an inventory allocation factor for each of the plurality of regions that makes the expected cost for each of the plurality of regions fall within a specified range.

20. The system of claim 16, wherein allocating the portions of the total number of units to reduce the sum of the expected costs comprises deriving an inventory allocation factor for each of the plurality of regions that makes the expected cost for each of the plurality of regions approximately equal to each other.

* * * * *